United States Patent [19]

Schwab

[11] 4,158,840
[45] Jun. 19, 1979

[54] 3-D RADAR COMPRISING 2-D RADAR WITH HEIGHT FINDING ATTACHMENT

[75] Inventor: Carl E. Schwab, Huntington Station, N.Y.

[73] Assignee: General Signal Corporation, Rochester, N.Y.

[21] Appl. No.: 850,528

[22] Filed: Nov. 11, 1977

[51] Int. Cl.² .................... G01S 7/20; G01S 9/233
[52] U.S. Cl. .................... 343/6 R; 343/7.9; 343/17.2 PC
[58] Field of Search .................... 343/6 R, 7.9, 17.2 R, 343/17.2 PC

[56] References Cited

U.S. PATENT DOCUMENTS

| | | | |
|---|---|---|---|
| 3,266,038 | 8/1966 | Milne et al. | 343/17.2 R |
| 3,328,797 | 6/1967 | Jorna et al. | 343/7.9 |
| 3,344,426 | 9/1967 | Long | 343/17.2 R |
| 3,618,086 | 11/1971 | Van Staaden et al. | 343/6 R X |
| 3,648,285 | 3/1972 | Sanders | 343/17.2 R X |
| 3,945,007 | 3/1976 | Radford | 343/6 R |

Primary Examiner—T. H. Tubbesing
Attorney, Agent, or Firm—Milton E. Kleinman; Stanley B. Green

[57] ABSTRACT

A radar with 3-D capability comprises a conventional 2-D radar with a height finding attachment. More particularly, a height finding antenna is mounted on the back surface of the conventional 2-D antenna reflector and points in a direction 180° offset in azimuth from the direction of the 2-D antenna. An r-f transmitter with a linear frequency modulated output is coupled to the height finding antenna and controlled by a transmit control based on target range and azimuth data provided by the 2-D radar. The height finding pulse compression receiver also responds to this target information as well as the height finding return radar signal and extracts height information which is then made available to a suitable display.

22 Claims, 32 Drawing Figures

BEAM DIRECTION

TERMINATIONS

INPUT $d$, FEED DISTANCE

LINEAR ARRAYS

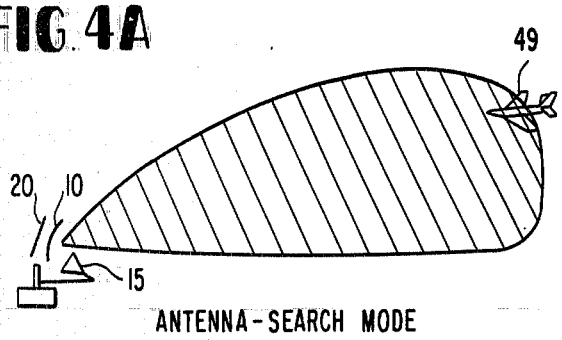
FIG.4A ANTENNA-SEARCH MODE
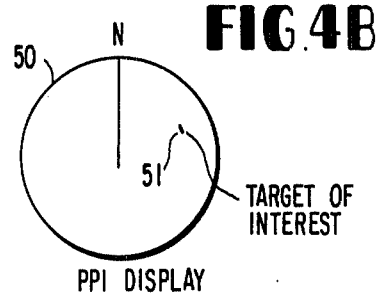
FIG.4B PPI DISPLAY
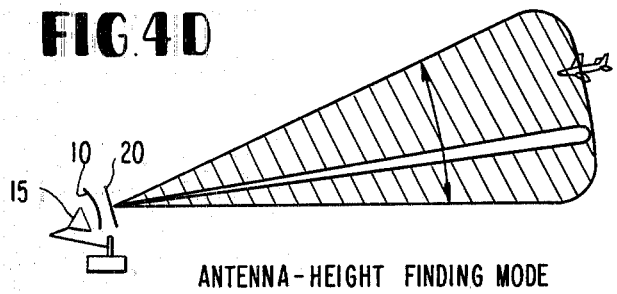
FIG.4D ANTENNA-HEIGHT FINDING MODE
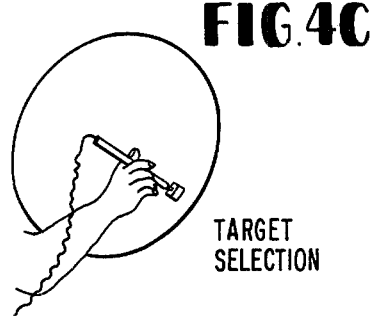
FIG.4C TARGET SELECTION
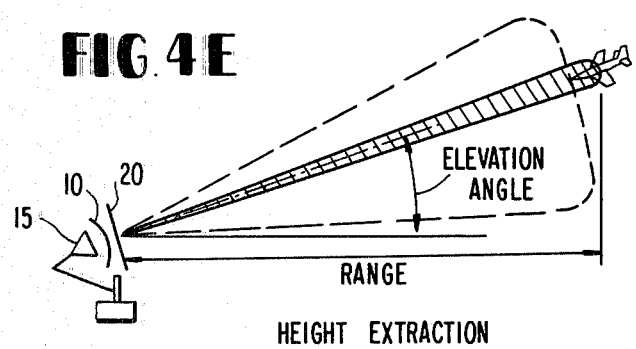
FIG.4E HEIGHT EXTRACTION
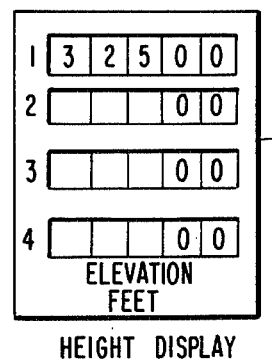
FIG.4F HEIGHT DISPLAY
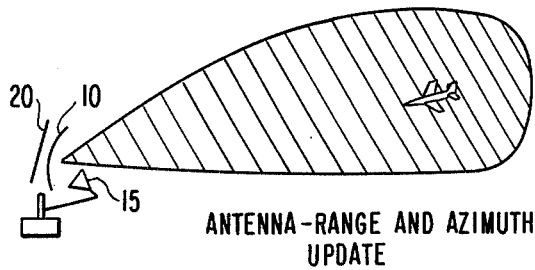
FIG.4G ANTENNA-RANGE AND AZIMUTH UPDATE

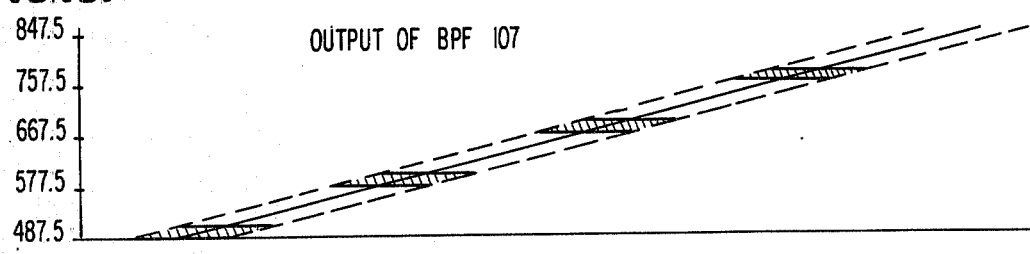
FIG.16A OUTPUT OF BPF 107
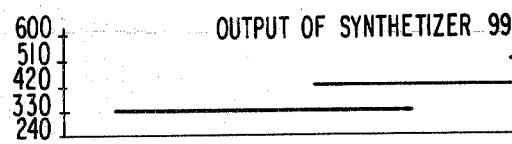
FIG.16B OUTPUT OF SYNTHETIZER 99
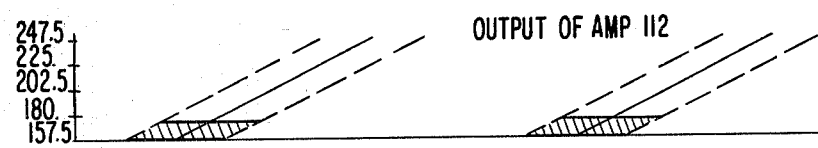
FIG.16C OUTPUT OF AMP 112
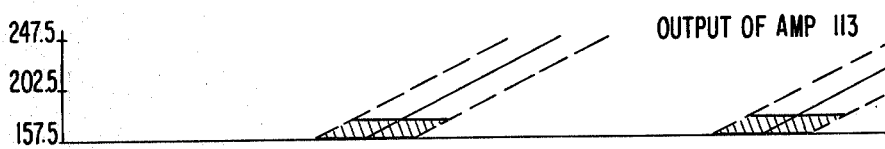
FIG.16D OUTPUT OF AMP 113
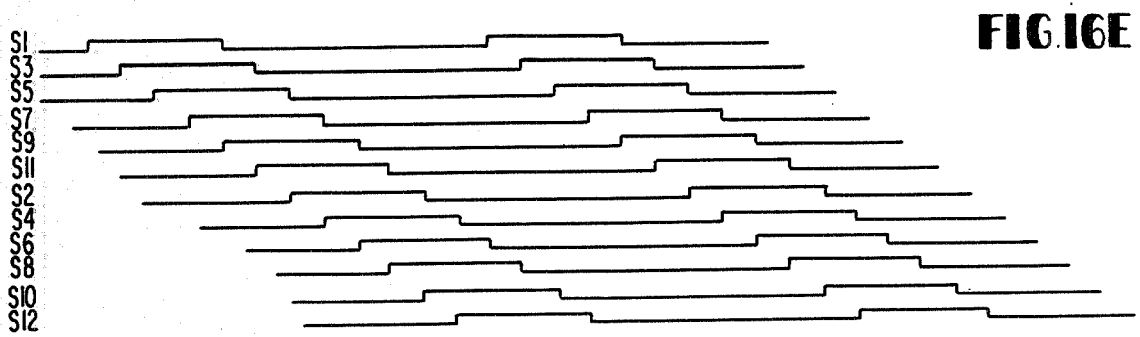
FIG.16E
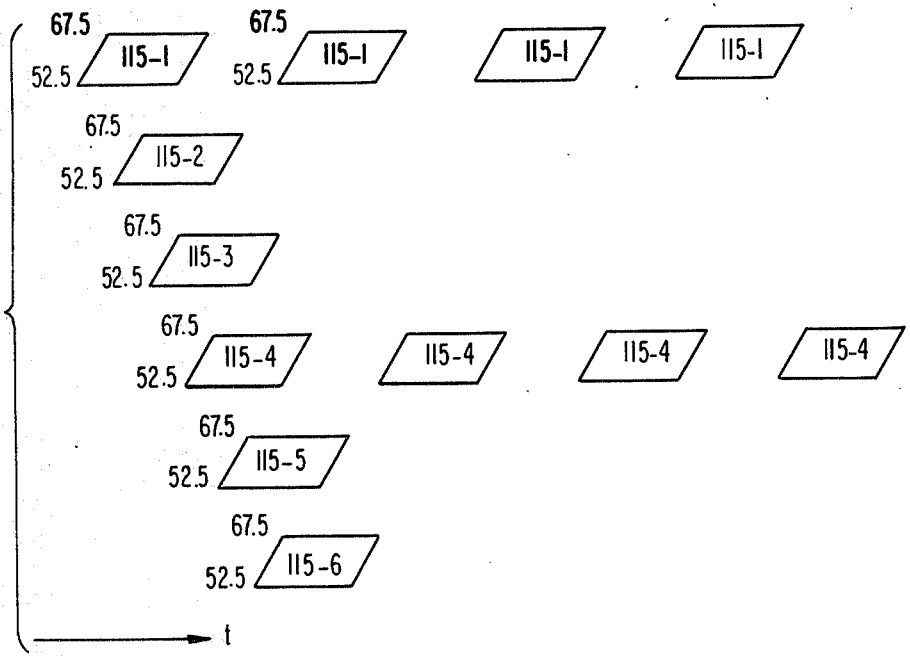
FIG.16F

3-D RADAR COMPRISING 2-D RADAR WITH HEIGHT FINDING ATTACHMENT

FIELD OF THE INVENTION

The present invention relates to radar systems, and more particularly, such systems which are capable of discerning target height or elevation as well as azimuth and range.

BACKGROUND OF THE INVENTION

A wide variety of radar systems are presently in use for locating target positions. For purposes of this application, the targets which are to be detected are capable of motion in three dimensions, for example, aircraft.

The location of an object capable of motion in three dimensions can be accomplished using a variety of techniques. By far the most popular technique in use today employs a two-dimensional radar, i.e., one locating a target in range and azimuth. Height information may be obtained by interrogating the target which generates a reply from the target including its height. Of course, this is possible only for those targets which are equipped with responding equipment.

Another approach which is successfully employed to locate targets in three-dimensions and which does not rely upon target carried equipment is a so-called 3-D radar.

Generically, 3-D radar designs must be a compromise. On the one hand, S/N ratios must be maximized to insure target detection. This effort generally is at odds with the desire to obtain high resolution. Accordingly, resolution, detection probability, or both, are less than what would be available in a 2-D radar system.

In some cases, two antennas are used, one sweeping in azimuth and the other simultaneously nodding in elevation. This arrangement has the obvious disadvantage of requiring two radar heads and the necessary associated equipment to produce the complex desired motion. Skolnik, in "Introduction to Radar Systems" (McGraw-Hill 1962), p. 459, suggests mounting a height finding antenna back-to-back with a search radar antenna. Milne, in "The Combination of Pulse Compression with Frequency Scanning for Three-Dimensional Radars" appearing in *The Radio and Electronic Engineer*, August 1964, pp. 89–106, suggests use of a linearly frequency modulated pulse to scan in elevation as the antenna scans in azimuth. While this would avoid the disadvantages of two radar heads it does not meet the other difficulty mentioned above.

The present invention overcomes these difficulties and achieves relative simplicity by employing a clip-on height finder antenna which is mounted on the back side of the 2-D radar reflector. Thus, the mounting of the clip-on height finder antenna provides the necessary azimuth sweep from the same pedestal and mounting components which sweep the 2-D or search antenna in azimuth. The invention also overcomes the necessity for mechanical components to nod the height finding antenna in elevation by employing a frequency scanned height finding antenna array which scans elevation as a function of transmitted frequency. Of course, the elimination of the mechanical components to nod the height finding antenna is not achieved without a corresponding "cost." The difficulty normally associated with frequency scanned radars is that the information to be extracted from the return signal is encoded in terms of frequency, and its time of receipt is further variable based upon the targets' range. This characteristic of the return signal, i.e., it is unknown in terms of frequency and time of receipt, is one of the main causes of complexity and corresponding expense in 3-D radars. Typically, plural receiver channels are employed, each covering a different frequency increment of the total required to scan the elevation area of interest. In this regard, see Long, U.S. Pat. No. 3,344,426. With this technique, while the number of receiver channels can be decreased, in an effort to reduce the cost and complexity, such reduction results in a direct reduction of accuracy and is therefore undesirable.

The simplification of pulse compression radar receivers has been a long standing goal. The prior art is typified by U.S. Pat. Nos. 3,774,201, 3,786,504 and 3,720,950, as well as "Putting the Squeeze on Radar Signals" by Collins in *Electronics*, January 1968, pp. 86–94. In this approach, the bandwidth of receiver components is reduced without reducing resolution by exchanging processing time for bandwidth, i.e., non-real time processing. The disadvantage of this approach is the requirement for additional signal processing. Whether this approach is successful depends on whether the trade-off between component bandwidth reduction is worth the added complexity occasioned by the need for the additional signal processing.

In accordance with the present invention, receiver complexity is reduced by taking advantage of a priori target range and azimuth information which allows reuse of a single receiver channel; indeed, under certain circumstances, only a single receiver channel is necessary. This is achieved by tuning the channel to the target's range prior to operation of the height finder. Were the target's range known precisely, only a single receiver channel would be necessary. However, inasmuch as the search radar and height finding radar are offset about 180° in azimuth, their scans of similar search volumes are offset in time. The target's motion during this time period results in target range uncertainty and thus the necessity for multiple receivers. Nevertheless, the number of different receiver channels is vastly reduced over that required by prior art techniques.

A further advantage of the invention is its modularity. More particularly, the present invention allows the integration of a height finder of reduced complexity with a conventional 2-D search antenna, even after the conventional 2-D antenna has been in use for some time. This allows the user to upgrade his two-dimensional radar capability for full 3-D capability, but allows that decision to be postponed until such time as the additional capability is necessary, and further, does not penalize the user by requiring him to purchase either a stand-alone three-dimensional radar system or even a stand-alone height finding system.

SUMMARY OF THE INVENTION

The invention achieves these and other desirable qualities by providing a height finder attachment to a conventional 2-D radar system. The height finder attachment includes a frequency scanned height finding antenna which is mounted on the back surface of a two-dimensional search reflector and thus provides a height finding beam which is 180° offset in azimuth from the beam of the search antenna. The frequency scanned height finding antenna array eliminates the necessity for any further equipment providing for height finding antenna array motion in that azimuthal motion is provided by its mounting and elevational motion is not necessary. The height finding attachment inludes apparatus to respond to information from the search readar defining a target's range and azimuth. Thus, the height finding system need not comprise a system having stand-alone height finding capabilities. Rather, information gained from the search antenna is used to simplify the height finder. The height finding radar is enabled to transmit only in azimuth sectors in which a target is expected to be located. Furthermore, the elevational sweep of the antenna can be limited depending upon the target's range. For example, in a system which is to sweep 0° to 20° with a height limitation of 80,000 ft., targets beyond 37 nautical miles do not require the full 20° sweep and thus the transmitter can be programmed depending upon target range to concentrate transmitter energy within those volumes in which the target is expected.

The receiver which extracts information from the returned height finding signal is also configured to take advantage of the a priori knowledge of range. More particularly, each receiver channel must be tuned to the expected return signal frequency. Using a reasonable figure of 0.81° elevation resolution, the full elevation sweep of, for example, 20°, requires the equivalent of 24 beams. For a height finding system without knowledge of target range, a full complement of 24 receiving channels would be required. With a knowledge of target range, however, even limited for a reasonable amount of range uncertainty, receiving channels can be reused, thus reducing the receiver complexity and accordingly, its expense.

More particularly, for the case in which target range is unknown, each receiver channel, tuned to a single beam, must listen throughout the entire elevational sweep. On the other hand, even with the knowledge of range limited by uncertainty based on target motion, the period during which a receiving channel must be tuned to a specific beam is limited, thus, by retuning receiver channels they may be reused, reducing receiver complexity. This time-sharing of receiving channels can be carried even further. Each receiving channel requires a compression filter in accordance with conventional matched filter processing techniques. The compression filter, typically a surface acoustic wave device, is a relatively expensive component and this time-sharing of channels enables the number of compression filters to be reduced. However, in accordance with a further feature of the invention, the channels are divided into a plurality of groups, and each group of channels time shares a single compression filter and thus the number of compression filters is reduced below the number of channels, and is equal to the number of groups of processor channels. Based on bandwidth considerations, only two compression filters are required in a preferred embodiment. More powerful compression filters obviously would reduce the number, and were a single compression filter available capable of handling the required bandwidth, only a single such compression filter would be required.

The outputs from the plurality of channels are then digitized and integrated, again in time shared apparatus, thus requiring digitizing and integrating channels only equal in number to the number of channels. Finally, a microprocessor compares the output from each of the channels in each of the range cells and determines the range cell and, determines elevation angle. From elevation angle and range, height is determined and is outputted to the display apparatus which is also driven by outputs of the 2-D radar processor. In this fashion, the display is provided with range, azimuth and height information.

BRIEF DESCRIPTION OF THE DRAWINGS

The present invention will now be described in further detail so as to enable those of ordinary skill in the art to make and use the same in accordance with the best mode known to the applicants, in connection with the accompanying drawings in which like reference characters identify identical apparatus and in which:

FIGS. 4A-4G illustrate typical operation of the inventive apparatus and particularly the use of range information supplied by the search radar in determining target height;

FIGS. 16A-D and F are frequency v. time plots for spectra in various portions of the FIG. 9 receiver;

FIG. 16E is a timing diagram of operation of switches in the FIG. 9 receiver.

DETAILED DESCRIPTION OF PREFERRED EMBODIMENTS

Figure 1:
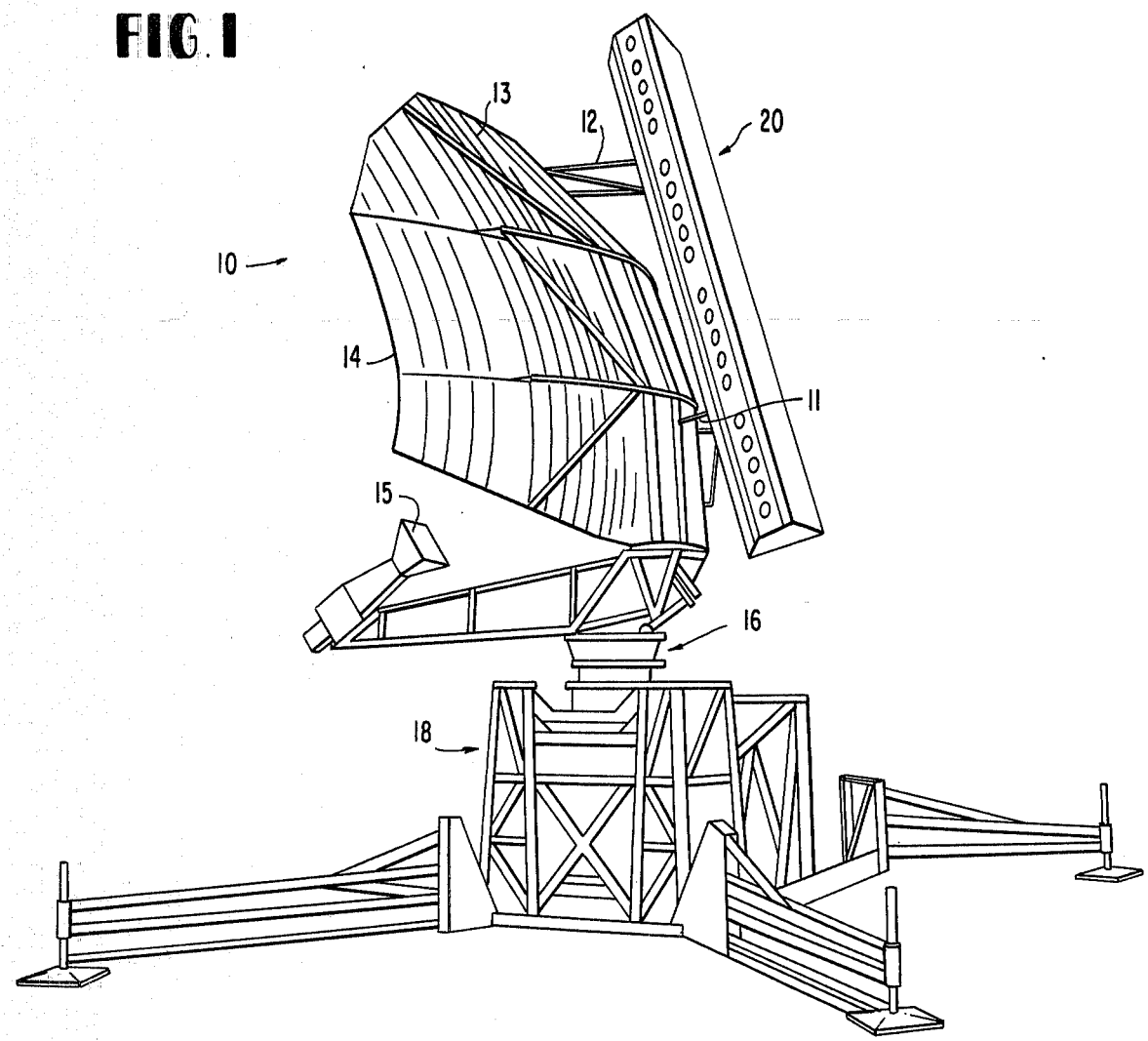
FIG. 1 illustrates the mounting of search and height finding antennas.

FIG. 1 is an illustration of the antennas employed in the apparatus of the invention along with the associated supporting and rotating structure. More particularly, a conventional search antenna 10 is mounted on a rotary turntable 16 which itself, in turn, is mounted on a support 18 so as to stably support the associated superstructure. Microwave energy is provided through a feed 15 and reflected from the front face 14 of the antenna 10 in a manner well known to those skilled in the art. When such energy is reflected by an object, or target to be located, a portion of the reflected energy impinges on the front face 14 of the reflector which focuses the energy onto the feed 15 from whence it is coupled to a receiver and processing circuitry to extract target range and azimuth. The antenna 10 may be referred to hereinafter as a search antenna in that it is intended to locate range and azimuth of targets, but itself is incapable of extracting height information from those targets. Mounted on the back surface 13 of the antenna 10 is a height finding antenna 20. As illustrated in FIG. 1, the antenna 20 is mounted on the back surface 13 through supports 11 and 12. As is conventional in the art, the antenna 10 rotates in azimuth and emits energy in pulses in the particular direction the antenna is pointing. As the antenna rotates in azimuth, the energy emitted by the antenna sweeps 360° in azimuth. The height finding antenna 20, mounted on the back surface 13 of the reflector, also emits energy in a defined direction, and as the antenna 10 rotates, so, too, does the antenna 20 and thus the energy emitted by the antenna 20 can sweep out 360° in azimuth. As will be explained in more detail below, the transmitter coupled to antenna 20 is controlled to transmit only in azimuth sectors containing a target located by the search radar. As is apparent from viewing FIG. 1, the directions of energy emitted by the antennas 10 and 20 is offset. In accordance with a preferred embodiment the offset is approximately 180° in azimuth.

Figure 2A:
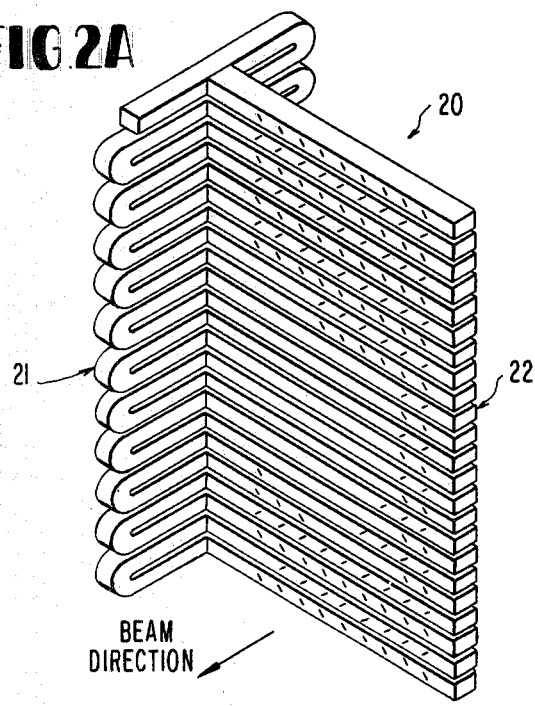
FIGS. 2A and 2B are mechanical and electrical illustrations, respectively, of the height finding antenna.
Figure 2B:
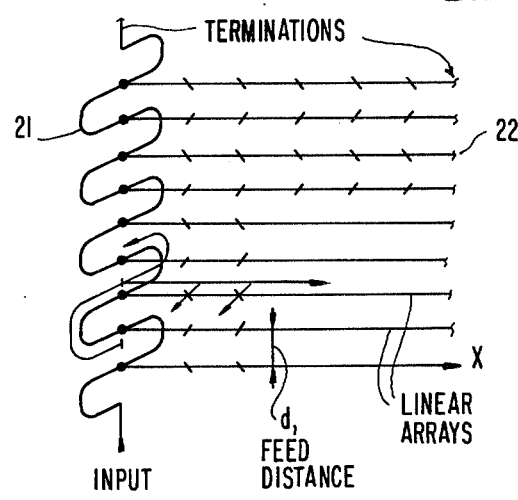

FIGS. 2A and 2B are illustrations of the height finding antenna 20, FIG. 2A is a view of the appearance of the antenna whereas FIG. 2B is an electrical schematic. As shown in FIG. 2A, a sinuous feed 21 couples energy from an input terminal (not illustrated in FIG. 2A) which is terminated at the upper extent of the sinuous feed 21. A plurality of waveguides 22, located in a common plane, each electrically coupled to sinuous feed 21, are also illustrated. Application of microwave energy to the input of the sinuous feed results in emission of an electromagnetic wave in a direction illustrated by the arrow referenced BEAM DIRECTION in FIG. 2A. The array of waveguides 22 is slotted in the face of the antenna from which the beam emanates, and the end of each of the waveguides 22 which are not connected to the feed, is terminated. FIG. 2B is an electrical schematic of the showing of FIG. 2A. As is well known to those skilled in the art, as the frequency of energy applied at the input is varied, the angle made by the beam to a normal to the plane formed by the slotted surface of the waveguide varies. Thus by varying the frequency of the microwave energy, the angle, or elevation of the beam can be adjusted.

Figure 3A:
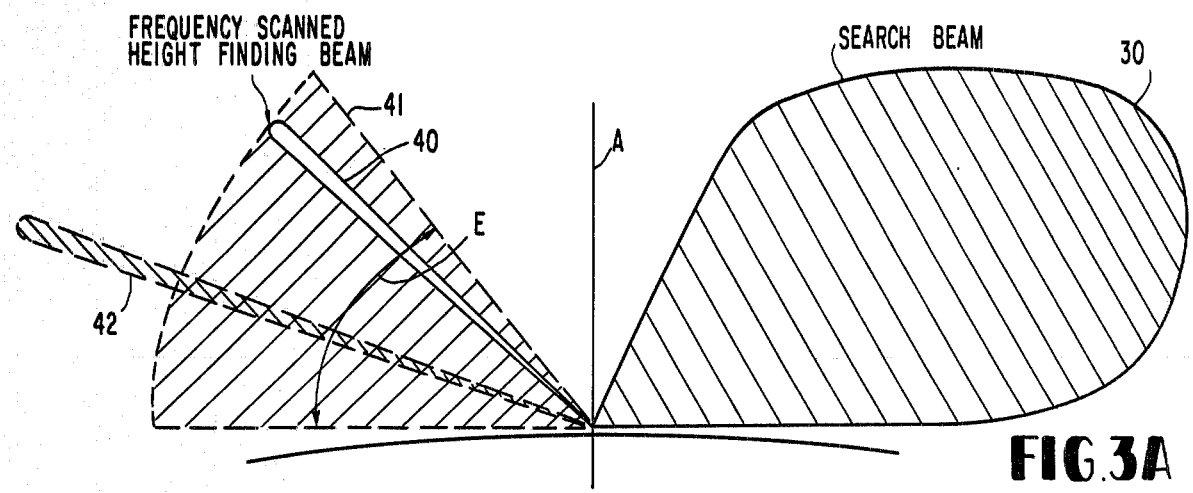
FIGS. 3A and 3B show antenna radiation patterns in vertical and horizontal planes, respectively.
Figure 3B:
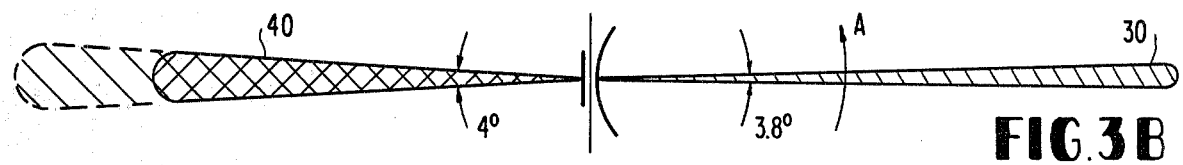

FIGS. 3A and 3B illustrate cross-sections of the beams emitted by the respective antennas 10 and 20 in a vertical and a horizontal plane, respectively. For example, in FIG. 3A, 30 represents the cross-section of the emitted beam from antenna 10 in a vertical plane intersecting the antenna feed 15. In a horizontal plane, the cross-section of the beam is shown in FIG. 3B, and as the antenna 10 rotates, the beam rotates in the direction of the arrow A. In a typical embodiment, for example, the beam is 3.8° in width. The other portions of FIGS. 3A and 3B illustrate the beam emitted by the height finding antenna 20. More particularly, as shown in FIG. 3A, 40 identifies the instantaneous beam position at a random point in time. As the microwave input is scanned in frequency, the beam scans in elevation in a direction identified by the arrow E in FIG. 3A. Accordingly, over a period of time, the beam can sweep out the area represented by 41 in FIG. 3A. A similar showing in FIG. 3B identifies the cross-section of the beam in azimuth where, for example, it may be 4° wide.

While the beam can be controlled to scan through the elevation E, it can also be controlled to scan a lesser portion of elevation angle, as will be detailed below. Furthermore, in still another mode of operation, the beam can be directed at a specific angular elevation, and thus not sweep in elevation at all. A typical representation of the beam for that mode of operation is illustrated at 42, and it is illustrated as extending beyond the range extent of the volume 41 normally swept inasmuch as the entire energy of the antenna is concentrated at a selected elevation angle.

In normal operation, when target height requests are pending, the search beam 30 is rotated about the axis A and the height finding beam 40 is enabled in the vicinity of the azimuth at which a target has been identified whose height is being requested.

Typical operating sequences are shown in FIGS. 4A-4G. FIG. 4A is a schematic illustration of the antennas 10 and 20 with only the search beam of the antenna 10 operating. As illustrated, a target 49 has entered within the volume covered by the search beam. The return signal collected by the reflector 10 is processed in a conventional manner and causes a display of the target 51 on a PPI display 50, shown as FIG. 4B. In one mode of operation, wherein a height request is manually initiated, the operator may position a light pen on the display at the target whose height is to be extracted, causing the target's range and azimuth to be communicated to the height finding components, as schematically illustrated in FIG. 4C. Subsequently, on the next azimuth sweep of the height finding antenna 20 transmission from antenna 20 is enabled (FIG. 4D) and the beam will sweep through a related volume, at the azimuth of interest and throughout an elevation sweep determined by target range, as will be described below. The return radar signal from the target will be collected by the antenna 20, as shown in FIG. 4E, and displayed in a manner to be described on the display 52, for example, as shown in FIG. 4F. Once the target has been selected, and its height extracted on a single sweep, both the search and height finding radars may continue to track the target to update its azimuth, range and height, the range and azimuth updating operation schematically illustrated in FIG. 4G.

FIGS. 4A through 4G illustrate one typical mode of operation wherein height information is manually requested by an operator. Other modes of operation include automatic extraction of any target within the search volume or automatic height extraction on any target within a predetermined portion of the search volume. The apparatus to perform these functions is illustrated in block diagram form in FIG. 5.

Figure 5:
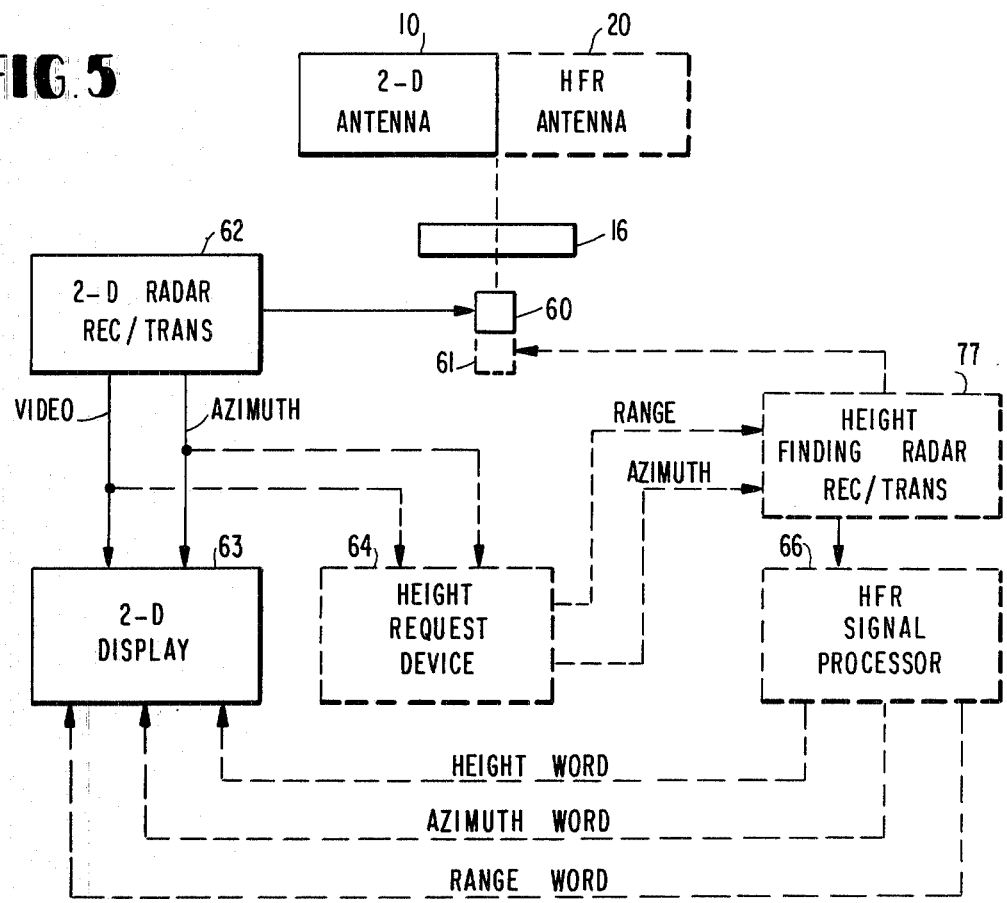
FIG. 5 is a block diagram of the apparatus.

As shown in FIG. 5, the antenna 10 is mounted on a rotary turntable 16. A conventional rotary joint 60 electrically couples the antenna 10 to search radar receiver/transmitter 62, the output of which, comprising video and azimuth data, is coupled to a conventional two-dimensional display 63. Thus, the display such as the display 50 (see FIG. 4B) is enabled to display range and azimuth of a target which has been located. A height request device 64 also receives video and azimuth of targets that have been located by the search radar. This device makes available to the height finding receiver/transmitter 77 a range word and azimuth word defining, in digital form, the coordinates of a target that has been located and whose height is to be determined.

The height finding antenna 20 is mounted on the reflector 10 (see FIG. 1) and is thereby supported and rotated by the same rotary turntable 16. A second rotary joint 61 electrically couples the height finding antenna 20 to the height finding radar receiver/transmitter 65. Under certain circumstances, it may be possible to frequency multiplex and time multiplex (for power considerations) the signals in rotary joint 60 so that additional joint 61 is not necessary. The height finding receiver/transmitter 65 provides a video output of the height finding radar signal processor 66 which determines, from the video, a height word corresponding to a range and azimuth of an object and makes this data available to a display such as the display 63. The display 63 may be a conventional CRT PPI display which is capable of writing alpha numeric characters, identifying height information, for example. On the other hand, the height display may be an alpha numeric display, separate from the PPI display, and such a height display may take the form of the display 52 as shown in FIG. 4F. Since the height finding radar is capable of determining height of multiple targets, as is implied from the showing of the display 52, there must be some way of associating a height display with the target, and this can be accomplished by ranking targets in azimuth. Other arrangements are also apparent.

In those cases where all targets within the search volume are to have height extracted, the height request device 64 can merely couple the output of the receiver transmitter 62 to the height finding radar 65 and signal processor 66. On the other hand, where targets within a selected portion of the search volume are to have height extracted, the height request device 64 can comprise a plurality of comparators and registers to select those targets whose height is to be extracted. Furthermore, in those systems where target selection for height extraction is to be accomplished manually, the operator can position a light pen, such as shown in FIG. 4C, wherein the height request device 64 would merely extract the range and azimuth corresponding to the position of the light pen and make it available as shown in FIG. 5. A still further alternative is simply a manually operated keyboard into which an operator can insert range and azimuth for height extraction. Other variations for the height request device 64 will be apparent to those skilled in the art. From the foregoing description, the arrangement of conventional devices to perform this function will be apparent and no further description is deemed necessary here, except to say that the only requirement imposed on the height request device 64 is that it make range and azimuth data available in a form compatible with the height finding components to be disclosed hereinafter.

In the following description, the structure of the radar transmitter, radar receiver and signal processor will be disclosed in connection with a specific embodiment of the invention wherein the elevation volume to be monitored covers the angle of zero to 20° with a height limitation of 80,000 feet. Based on range and limitations of range degradation due to rainfall, a frequency of approximately 7 Ghz. was chosen, although those skilled in the art will understand how other frequencies would be suitable to suit various desirable parameters.

Figure 6:
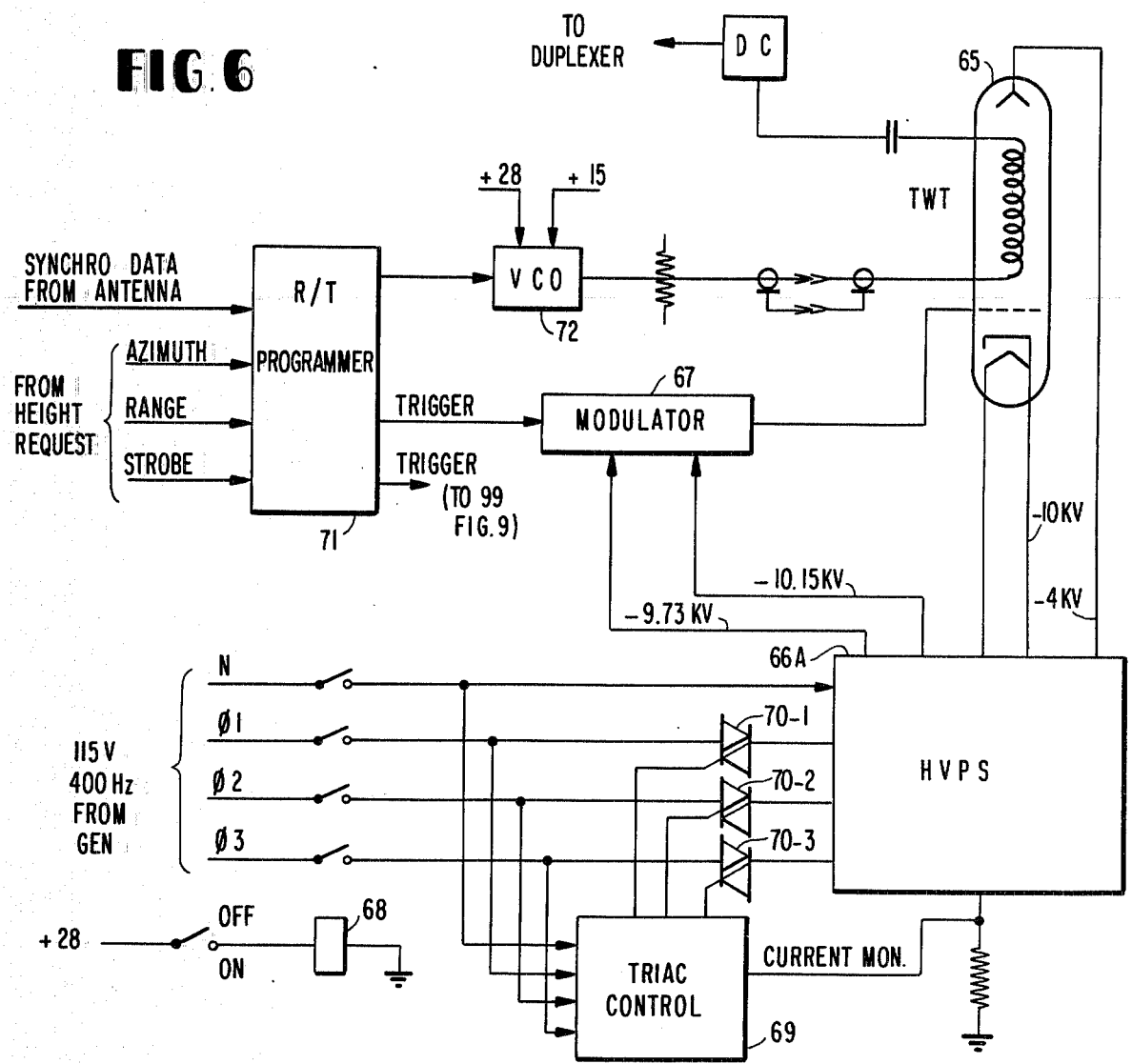
FIG. 6 is a schematic of the height finder transmitter.

The transmitter, shown in FIG. 6, comprises a travelling wavetube 65, which can be a Raytheon QKW 1704 grid pulsed, helix TWT. High voltage energy is supplied to the TWT 65 from a high voltage power supply 66A. Power is also supplied to a modulator 67. The high voltage supply 66A is fed from any suitable power supply, such as, for example, a 400 Hz. 3-phase supply connected through contacts of a relay 68. Triac control 69 monitors input voltage and current and controls series connected Triacs 70-1 through 70-3 for regulation purposes. The output of modulator 67 is coupled to the grid of the TWT 65. The modulator 67 is, in turn, controlled by a receiver/transmit programmer 71 which also supplies a control input to a VCO 72. The output of the VCO 72 is fed through an RF attenuator to the TWT helix and the output of the TWT is fed to the antenna duplexer. The programmer 71 receives inputs including the synchro data (or equivalent digital data) from the antenna defining the antenna's present position as well as digitally coded azimuth and range words from the height request device 64 and a strobing input for timing purposes.

The transmitter is normally off and only transmits when a height request has been received and then only in the vicinity of the azimuth of the target whose height is to be detected. The TWT 65 output is a linearly frequency modulated pulse of selected width and repetition rate as determined by the programmer 71 in accordance with the range of the target identified for height extraction. In response to a height request, programmer 71 generates trigger pulses to enable the modulator 67 to generate grid modulation pulses to turn on the travelling wavetube. Simultaneously, the VCO 72 is swept through the frequency range which is determined by the range of the target whose height is to be extracted. The swept waveform is applied to the RF input of the TWT and becomes the transmitted signal. This swept frequency range determines the elevation coverage provided by the height finder.

Figure 7:
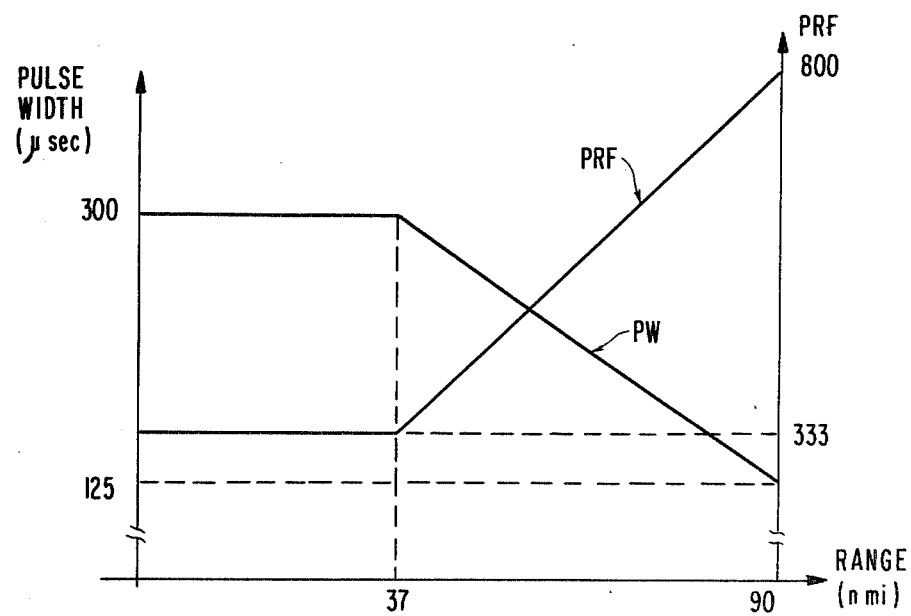
FIG. 7 is a plot showing operation of the transmit programmer to vary pulse width and PRF as a function of range.

By programming the frequency sweep, the apparatus takes advantage of the fact that the range of the target is known and it is enabled to concentrate as much power as possible on the target. For example, a target at 90 nautical miles only requires the elevation pattern to be swept less than 8° for 80,000 foot height coverage. Transmitting the full 20° elevation sweep would therefore be wasteful. However, there are two restraints on variations in the sweep schedule, i.e., the sweep rate must be the same so as to match the dispersive filters in the receiver and the duty cycle limitations of the TWT 65 must not be exceeded. FIG. 7 illustrates how pulse width and pulse repetition frequency are varied in accordance with target range through the use of programmer 71. That is, more particularly, for ranges up to 37 nautical miles, the pulse width is constant at 300 microseconds and the pulse repetition frequency is constant at 333 PPS. Beginning at 37 nautical miles and extending to the 90 nautical mile range limit, pulse width is linearly decreased and the pulse repetition frequency is linearly increased until, at the maximum range, the pulse width is decreased to 125 microseconds and the pulse repetition frequency is increased to 800 PPS.

VCO 72 outputs a signal whose frequency is controllable by its input voltage about a center frequency which, in a preferred embodiment, is about 7 Ghz. A Greenray, P/N EPH171 is suitable, tuning over a 500 MHz. range from an input voltage of +9 to +30 volts DC. For a preferred embodiment of the invention, the tuning range required is 360 MHz., well within the capability of this device.

Figure 8:
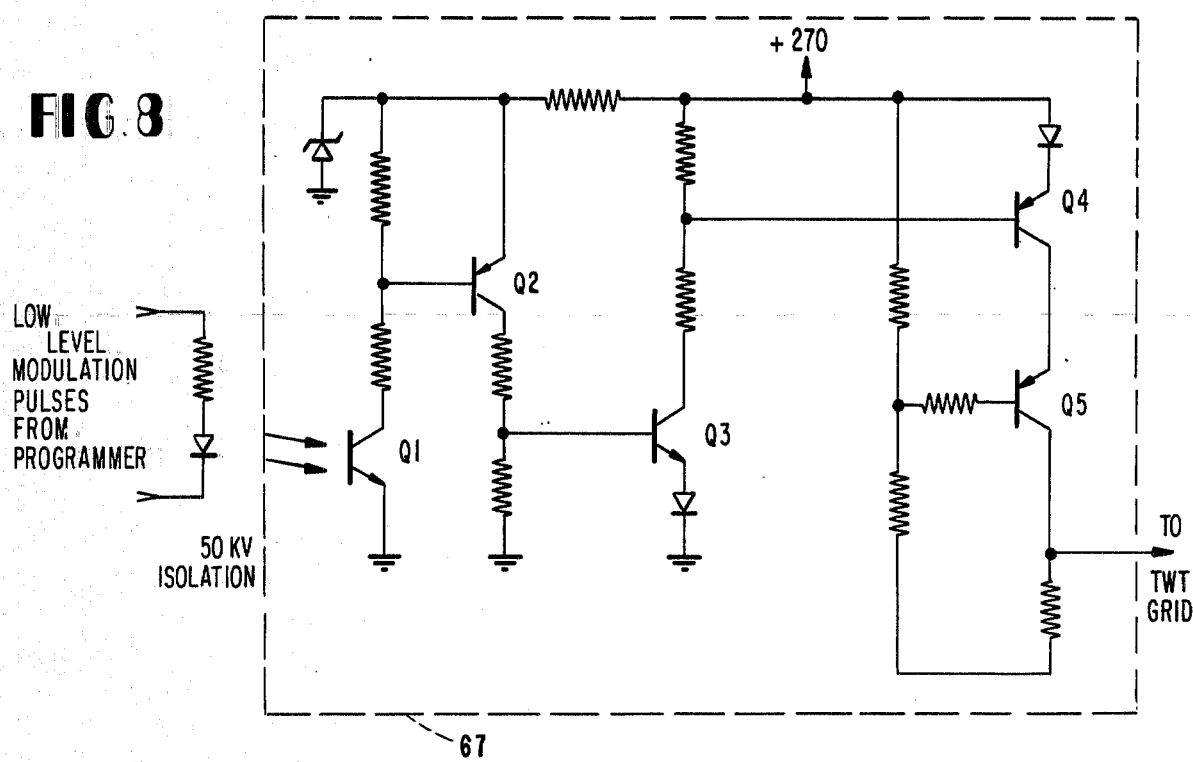
FIG. 8 is a schematic of the transmitter modulator.

A circuit diagram suitable for the modulator 67 is shown in FIG. 8. The modulation requirements for TWT 65 is a grid pulse of +270 V to enable the tube and −150 V to disable the tube. The output stage, that is, transistors Q4 and Q5 can be type 2N5416 having a $V_{ceo}$ of 300 volts. The collector resistor in the output stage must recharge a stray capacitance of about 30 picofarads. A value of 1 K provides a grid pulse fall time of about 1 microsecond, which is acceptable. Potentials applied to the grid are referenced to the cathode which is at −10 kv. This requires high voltage isolation between the programmer output and the input at stage Q1. As shown in FIG. 8, this is achieved by optical isolation. Standard optical couplers are frequently not capable of 10 kv isolation and a custom package is required but such is well within the skill of the art and for example, 50 kv isolation is suggested in FIG. 8.

The structure of programmer 71 is not disclosed herein as it is considered well within ordinary skill to fabricate the programmer from the preceding description. For example, a counter, clocked at a constant rate, could be preset by a range decoder and trigger a slope generator. By varying the preset count, pulse repetition is varied. A similar arrangement could be employed to control pulse width.

Programmer 71 thus controls the extent of the elevation sweep dependent on range. Even more limited elevation sweeps can be manually controlled by limiting the output of the sweep generator so as to concentrate energy at a desired elevation. This approach provides a "burn through" mode to cope with jamming, for instance.

Accordingly, the transmitter output is not present unless a height request has been received and the antenna is in the vicinity of the azimuth at which the target has been located. The output is a series of linearly frequency modulated pulses, having a center frequency of about 7 GHz., whose pulse width may be from 125 to 300 microseconds and repetition rate of 333 to 800 pulses per second. As the radiated energy scans in elevation, a small portion of it is reflected by the target and received back at the antenna 20. The received signal, a small portion of the transmitted signal, and for an assumed point target has a fixed time bandwidth product. Conventional matched filtering techniques are preferable and require that the receiver processor have a transfer function which is the complex conjugate of the received signal for optimum signal-to-noise ratio; that is, the receiver bandwidth must be limited to the bandwidth of the received signal and a delay spectrum must have a slope opposite the transmitted waveform. Compression filters comprising surface acoustic wave devices are commonly used to implement the phase characteristic.

Figure 11:
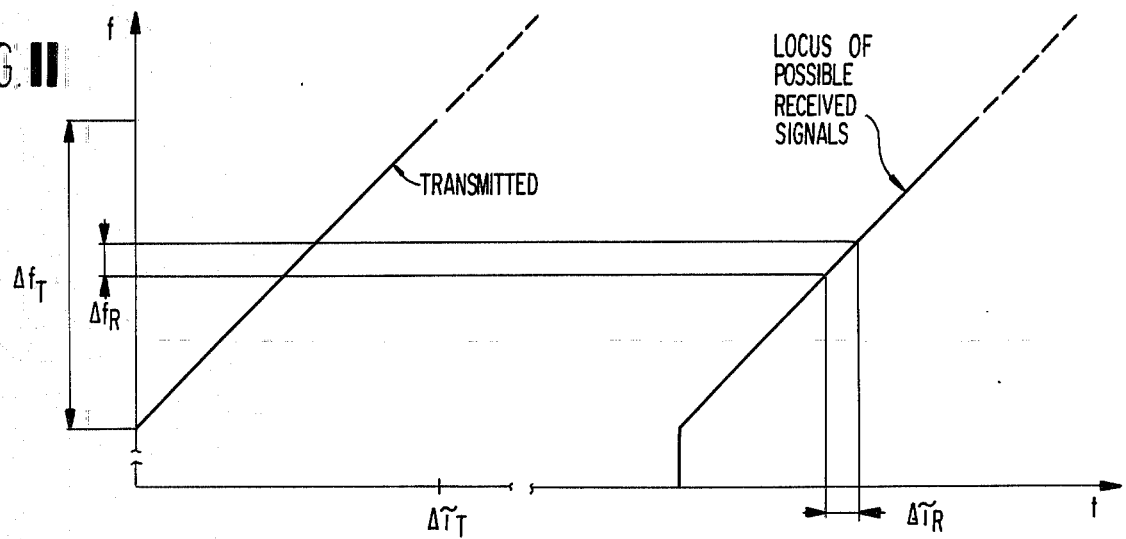
FIG. 11 shows frequency v. time for typical transmitted and received signals.

FIG. 11 graphically represents the transmitted and received signals, plotting frequency versus time. As shown in FIG. 11, the transmitted signal exists over a frequency spectrum $\Delta f_t$ and a typical pulse width has a period of $\Delta \tau_t$. The return signal is a portion $\Delta f_r$ of the transmitted signal wherein the ratio $\Delta f_r/\Delta f_t$ is governed by the size of the antenna and the resulting elevation beam width. The desired height information is contained in the frequency spectrum of the received signal.

To extract this information, the received signal can be down converted to IF and applied, in parallel, to a number of processing channels equal in number to the number of separately resolvable beams required to encompass the entire sweep. Each processing channel of such receiver would include a further down converter so that the output of each down converter is a signal of identical bandwidth and center frequency to the signal in each of the other processing channels. The signal is then provided to a compression filter in each channel to optimize the signal to noise ratio. Such arrangement, however, is wasteful of apparatus.

Figure 12:
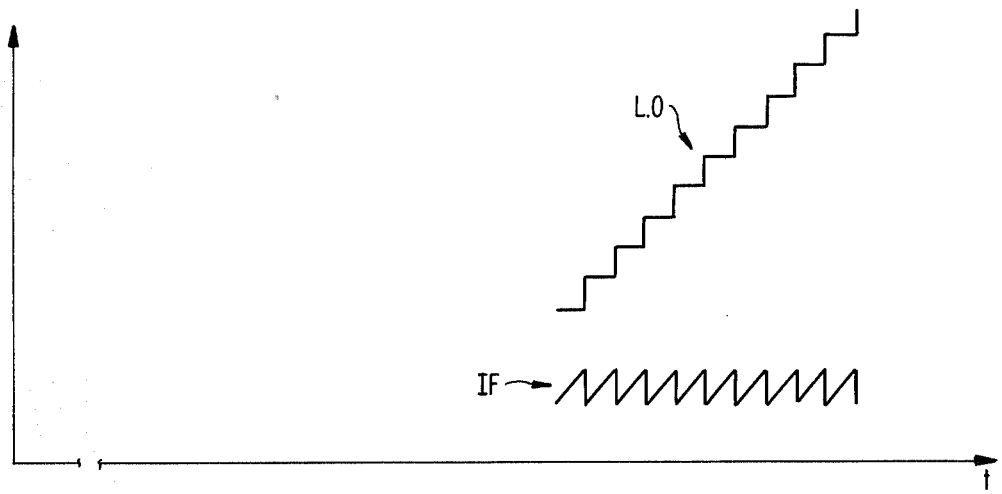
FIG. 12 is frequency v. time plot for L.O. output and IF useful in explaining operation of the inventive receiver.

The apparatus requirements can be reduced where information is available concerning the target's range, as it is in the present case. If range is known precisely, a stepped local oscillator can be started at a time corresponding to that range. Each frequency step lasts for a period corresponding to the expected duration of a received pulse with the slope of the stepped local oscillator frequency corresponding to the frequency slope of the transmitted energy. The IF and local oscillator waveforms for such an arrangement are shown in FIG. 12.

Figure 13:
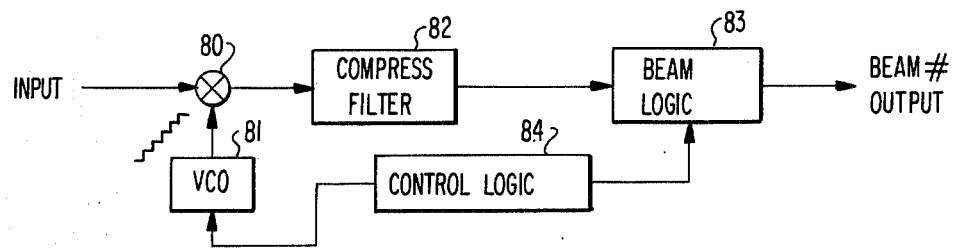
FIG. 13 is a block diagram of apparatus that provides the plots of FIG. 12.

A block diagram of the receiver arrangement is shown in FIG. 13. As shown, the IF input is applied to a mixer 80, another input of which is provided with the stepped local oscillator frequency waveform from a VCO 81. The mixer output is provided to a compression filter 82 the output of which is provided to a beam logic device 83. A control logic 84 responds to range information for triggering the VCO 81 and providing the beam logic 83 with information as to the progress through the stepped local oscillator waveform, thus identifying the elevation of a target of a corresponding received signal. This arrangement is attractive in that only a single receiver procressing channel is required. A disadvantage with the approach of FIG. 13 is that for any step of the local oscillator waveform corresponding to a particular elevation, other targets at the same range are ignored. Thus, for example, at any step of the local oscillator scan, a blind spot equal to the scanning period of 125 to 300 microseconds exists. This blind spot corresponds to as much as 25 nautical miles.

Figure 14:
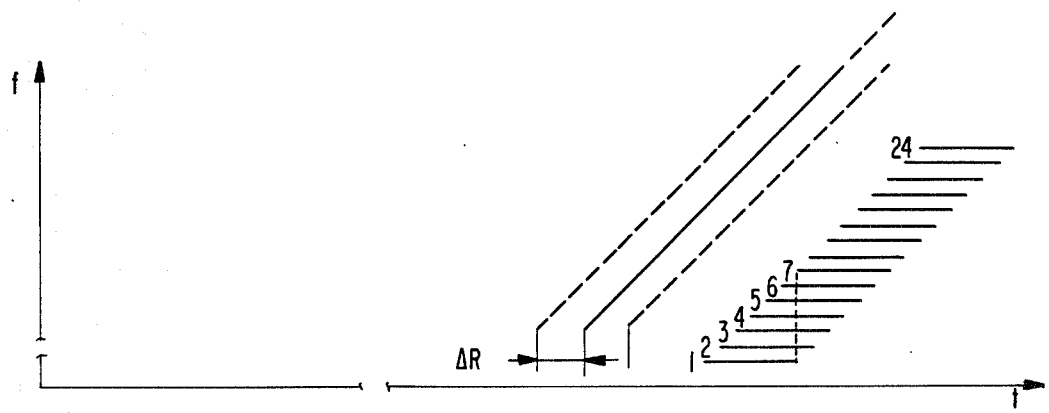
FIG. 14 is another frequency v. time plot showing effects of range uncertainty and how the apparatus handles the uncertainty.
Figure 15:
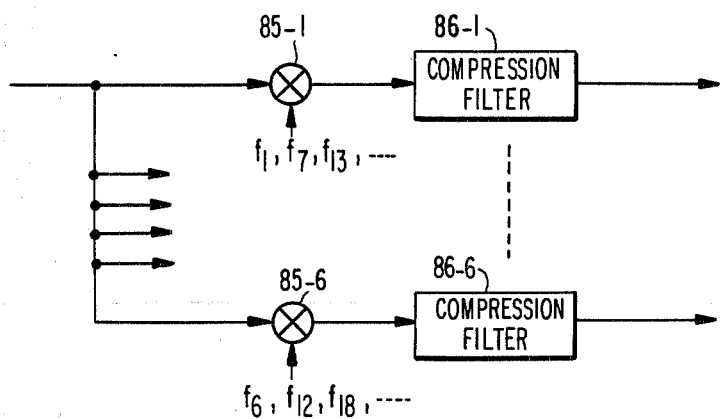
FIG. 15 is a block diagram of another embodiment of the height finding receiver.

Because of the time displacement between the search beam and the height finding beam, there is an uncertainty in target range estimation. For example, if the antenna is rotated 6 rpm., then the beams can only illuminate identical azimuths 5 seconds apart. For a target moving a mach 2, a potential range uncertainty of ±1.7 nautical miles exists. The height processing circuitry must be arranged to accommodate this uncertainty. The uncertainty condition is illustrated in FIG. 14 wherein the solid line corresponds to the locus of possible received signals (see FIG. 11) and the parallel dotted lines illustrate the range of times and frequencies when a return signal can be expected depending upon the target's actual position. The arrangement of FIG. 13 can still be employed except that each local oscillator step is maintained for a duration at least equal to twice the range uncertainty plus a slight additional interval equal to a pulse width to insure that a full received pulse width falls within at least one local oscillator step. For the parameters given above, that is, for 6 rpm. revolution rate of the antennas with targets limited to mach 2, and an expected received pulse width of 12.5 microseconds, the total on time for each local oscillator step is about 60 microseconds. Also plotted in FIG. 14 is the corresponding local oscillator frequencies versus times, where each step is numbered from 1 through 24. The vertical dotted line illustrates that local oscillator step 1 does not overlap in time with local oscillator step 7. Accordingly, the same processing channel can be employed for steps 1, 7, etc., i.e., every 7th local oscillator step can reuse a previous channel. Accordingly, only 6 processing channels are required instead of the 24 which would otherwise have been required. FIG. 15 schematically illustrates the signal processing arrangement wherein mixers 85-1 through 85-6 are coupled to the received IF signal and each has another input providing a portion of the stepped local oscillator waveform. Thus, mixer 85-1 may receive on its second input sequential pulses at frequencies $f_1$, $f_7$, $f_{13}$, etc. The output of each mixer is provided to a separate compression filter 86-1 through 86-6. This arrangement requires a number of separate processing channels equal to the number of separate antenna beams required to cover the elevation scan divided by the number of times a single processing channel can be reused which latter factor is a function of the range uncertainty at the time the height finder is operated. However, the number of compression filters required can be reduced even further inasmuch as the time bandwidth product of a received signal is about 200, i.e., 12.5 microseconds times 15 MHz. Conventional surface acoustic wave compression filters have bandwidth-time products of about 10,000. The potential time bandwidth product considering the 360 MHz. frequency band and the maximum 300 microsecond pulse width is approximately 90,000. By slicing this up into 4 increments and time sharing two compression filters the receiver processing can be accomplished with only two compression filters, so long as each can handle a time bandwidth product of about 6,750. FIG. 16A illustrates the locus of possible received signals as lying within the dotted lines. Employing a similar technique to that shown in FIG. 14, a second stepped local oscillator is employed generating the frequencies $f_{11}$, $f_{21}$, $f_{31}$ and $f_{41}$, each handling a quarter of the total 360 MHz. frequency increment. Each local oscillator step is on for at least 75 microseconds, twice the range uncertainty for a three nautical mile range uncertainty (which gives the capability for handling targets at somewhat above the mach 2 figure previously discussed).

The portion of the time bandwidth spectrum handled by a typical receiver channel is also shown crosshatched in FIG. 16A. The multiple time-bandwidth areas handled by each channel comes about by the reuse of each channel as a consequence of changing the mixer input for the channel in a progressive fashion, in a manner similar to that shown in FIG. 14.

Figure 9:
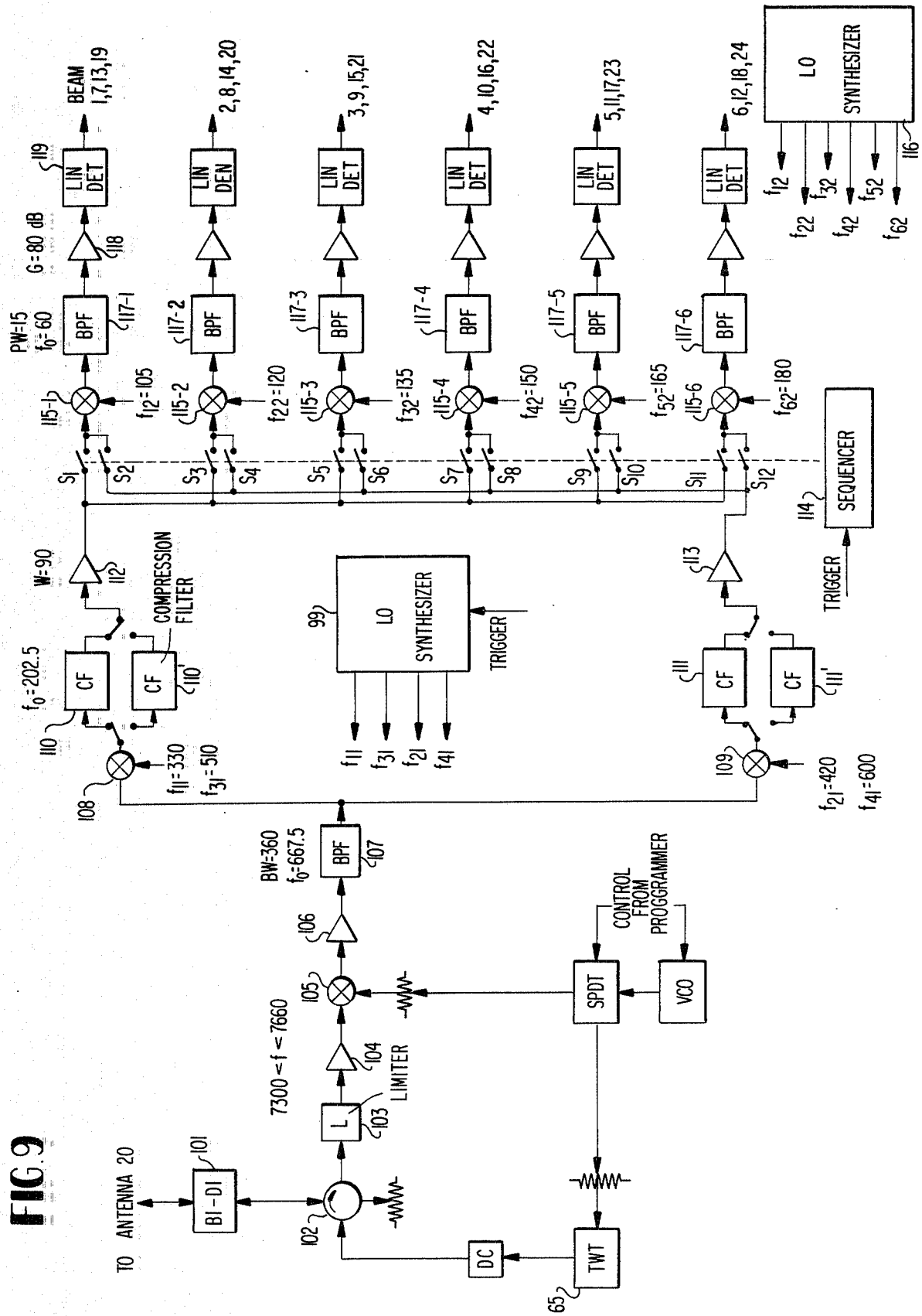
FIG. 9 shows the preferred embodiment of the height finder receiver and processor block diagram.

The receiver block diagram is illustrated in FIG. 9. As shown, a be-directional coupler (or bi-di) 101 couples the antenna 20 to a circulator 102, an input of which comes from the travelling wave tube 65 of the transmitter (see FIG. 6). An output of the circulator is coupled to a limiter 103. The amplitude limited output may include signals in a frequency range 7.30 Ghz., to 7.66 Ghz., (as a result of the 360 MHz transmitter sweep) and is coupled to an amplifier 104. The output of amplifier 104 is provided to a mixer 105. The other input to mixer 105 is a constant frequency r-f to produce the IF output. The output of mixer 105 is at the first intermediate frequency of 667.5 MHz. with a bandwidth of 360 MHz. This output is then bandpass filtered in filter 107 to insure the previously specified frequency characteristics of the signal.

The output of the bandpass filter 107 is fed in common to mixers 108 and 109, comprising the input elements for the two channels in the first stage of signal processing. Mixer 108 is fed by a local oscillator synthesizer 99, th outputs of which are $f_{11}$, $f_{21}$, $f_{31}$ and $f_{41}$, as illustrated in FIG. 16B. The first and third of these outputs are fed to mixer 108 in a time sequence as illustrated and the second and fourth of these local oscillator signals are provided as the second input to mixer 109 and are also fed in the illustrated time sequence. (See FIGS. 16C and 16D). A trigger input to the local oscillator synthesizer 99 is provided by the range/azimuth request from the R/T programmer (FIG. 6) for the range/azimuth request from the 2-D radar and causes the local oscillator synthesizer 99 to generate the frequencies indicated in FIG. 16B.

The output of each of the mixers 108 and 109 is provided to a different one of the corresponding compression filters 110 and 111. At this point in the signal processing, the signals have a center frequency of 202.5 MHz. with a bandwidth of 90 MHz., see FIG. 16C and 16D. The output of the compression filters are applied to one of amplifiers 112 and 113. The output of amplifier 112 forms an input to a plurality of switches S1, S3, S5, S7, S9 and S11. The output of amplifier 113 forms an input to another plurality of switches S2, S4, S6, S8, S10 and S12. The switches S1–S12 are controlled by a sequencer 114. In response to a trigger input the sequencer 114 controls these switches in accordance with the waveforms of FIG. 16E. As shown, each of the switches is normally open, and is closed when the waveform is high. As implied by the waveform diagram of FIG. 16E, while FIG. 9 illustrates mechanical switches, in a practical implementation, the switches are electronic, i.e., gates. Each pair of the switches S1, S2; S3, S4; etc., through S11, S12, are coupled to a mixer, thus comprising six mixers, 115-1 through 115-6. Each of the mixers has another input to which is applied one of the six output signals of a local oscillator synthesizer 116. The six outputs of this local oscillator are selected so that when mixed with a reflected signal the frequency spectrum in each channel will be identical after the bandpass filtering provided by one of bandpass filters 117-1 through 117-6. The combination of switch closure times and the bandpass filters result in each bandpass filter handling a 15 MHz. increment of the elevation sweep centered at 60 MHz without "losing" any of the frequency spectrum. This can be verified, for example, by noting that, at the beginning of the sweep, switch S1 is closed, coupling the output of amplifier 112 to the bandpass filter 117-1. At this point in time, the output of amplifier 112 is increasing linearly from 157.5 MHz. The other input to the mixer 115-1, at 105 MHz., giving a beat of 52.5 MHz., and the bandpass filter will pass any signal between that frequency and 67.5 MHz. Although switch 1 remains closed after the frequency of early returns is increased above this point, no further signals will be passed by the filter 117-1. After the frequency is past 67.5 MHz., switch S3 also closes, so that an input is available to mixer 115-2, the other input to which is at 120 MHz. Thus, the input to bandpass filter 117-2 starts at 52.5 MHz. and the switch S3 remains closed for a sufficiently long time so that it will pass any input to the mixer 115-2 up to 187.5 MHz. at which point switch S5 closes. The switch closures S1, S3, S5, S7, S9 and S11 continue in this fashion, as shown in FIG. 16E. After switch S11 has been closed for sufficiently long time to allow the sweep to reach the limit of its bandpass filter 117-6, having been mixed down by mixer 115-6, switch S2 closes and the same process is repeated for switches S2, S4, S6, S8, S10 and S12. This process is repeated once again as shown in FIG. 16E. That completes a frame of operation and a complete elevation sweep. Although not illustrated the next frame repeats the identical operations. Thus, the output of bandpass filter 117-1 will produce a pulse relating to target elevation in any of beams 1, 7, 13 and 19. The outputs from the remaining bandpass filters are identified in FIG. 9. Each of the bandpass filters is connected to an amplifier and a linear detector 118 and 119, all of which are identical. The combination of channel in which an output signals occurs, and the time at which that signal occurs, during the scan, define the elevation angle of the target.

FIG. 16F identifies in time-bandwidth space the portion of the spectra handled by each channel. In this Figure, the vertical coordinate for the various channels is identical (i.e., from 52.5 MHz. to 67.5 MHz.) although offset in the Figure for illustration purposes, the horizontal coordinate, time, is common.

The six channel receiver of FIG. 9 is the equivalent of a 24-channel receiver because range information allows reuse of each channel to provide the equivalent of four. A smaller range uncertainty would allow even further channel reuse which could be employed to reduce the number of physical channels. Range uncertainty can also be reduced by increasing antenna revolution rate or using range rate information from the search radar.

The sequencer 114 responds to the trigger, which is delayed from the transmission by a quantity determined by target range modified to account for the range uncertainty. That is, the trigger delay is $t_R - t_{\Delta R}$ where $t_R$ is the round trip delay and $t_{\Delta R}$ is twice the range uncertainty expressed as a delay time. The time for closing and opening any switch is measured from the trigger by noting the earliest and latest time of receipt of a reflected signal in the frequency-time spectrum to be handled by the associated channel. In this determination, account must be taken of the effect of the pulse compressors. Further details of the sequencer are not believed necessary. It is worthwhile to note, however, that with reduced pulse widths (i.e., less than 300 $\mu$sec., for example) some of the switch closures are not actually used inasmuch as the pulse terminates before the corresponding switch closure. In the example given here 24 switch closures are required. On the other hand, a 125 $\mu$sec pulse only requires about 10 switch closures. The switch closures following will not interfere with any operation but are simply unused.

Figure 10:
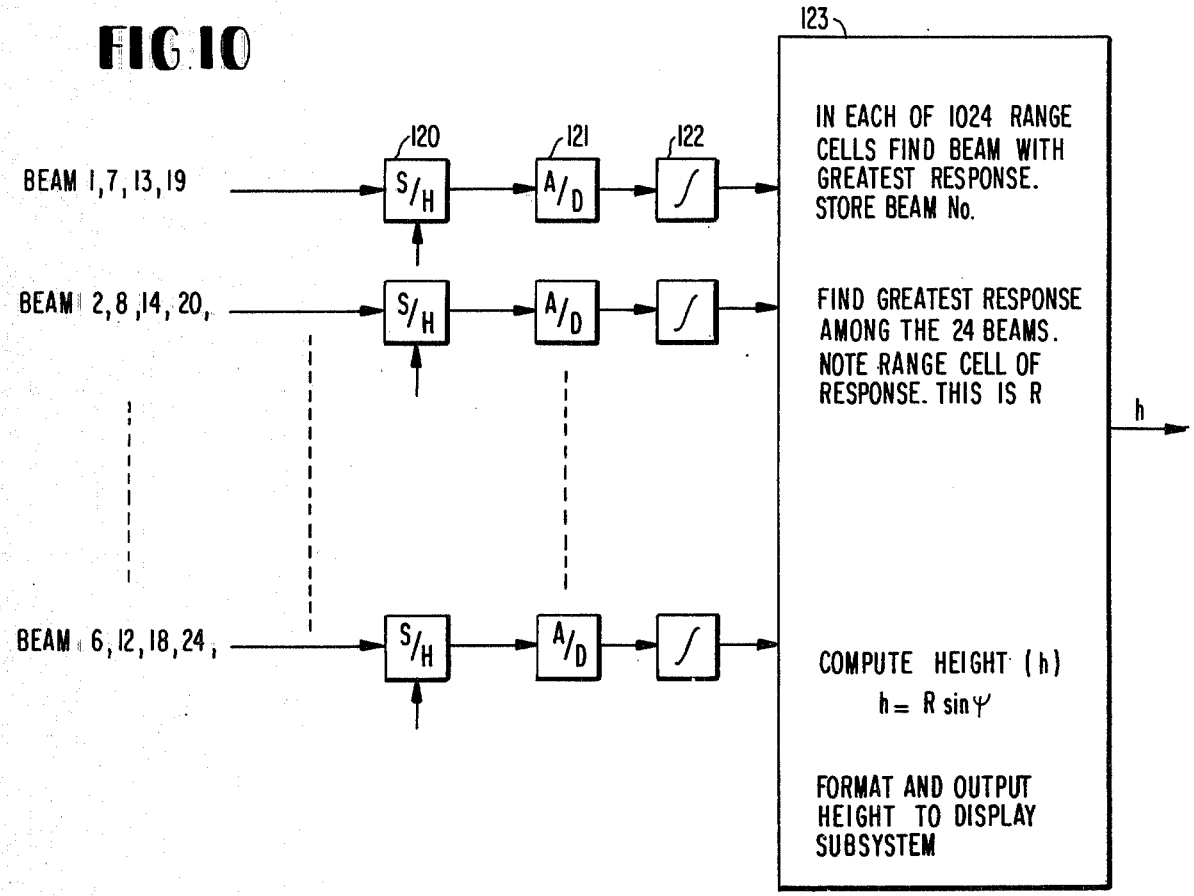
FIG. 10 shows the remainder of the height finder processor in block diagram form.

The remaining portion of the signal processing may occur, for example, in the apparatus of FIG. 10. This employs an integrating procedure so that responses from multiple scans can be used in height extractions. For responding to very high speed targets (mach 3 and above) per pulse processing may be advantageous. Those skilled in the art can use any of a variey of conventional processing techniques for extracting height data from the outputs of the FIG. 9 receiver. The FIG. 10 arrangement will be discussed below as exemplary. As shown there, the outputs from each of the detectors 119 in each processing channel is connected to a corresponding sample and hold device 120, the output of which is made available to an analog to digital converter 121, the output of which is, in turn, provided to an integrator 122. The outputs of each of the integrators 122 in each of the processing channels if provided as an input to a microprocessor 123.

As shown in FIG. 10, each of the sample and hold circuits 120 is clocked by the range clock. A reasonable range cell corresponds to 70 nanoseconds. The functions of sample and hold and analog to digital conversion can be performed within this time period employing conventional techniques.

The integrators 122 can be any of a variety of conventional integrators. The processor 123 responds to and stores integrator outputs as a function of time. The processor can then determine the targets' range and the beam of the elevation sweep which was most strongly reflected. Knowing range and elevation angle (corresponding to the reflected elevation beam) height is computed and output. If desired, a correction can be made for the effect of earth curvature employing a range table.

The preceding description has been in terms of a matched filter receiver requiring the transmitted sweep rate to be constant so that it will match the dispersion of the pulse compressors. However, for flexibility purposes it may be desirable to vary the sweep rate so as to concentrate more energy at specific elevations or simply to increase the transmitted energy over all elevations.

Figure 17A:
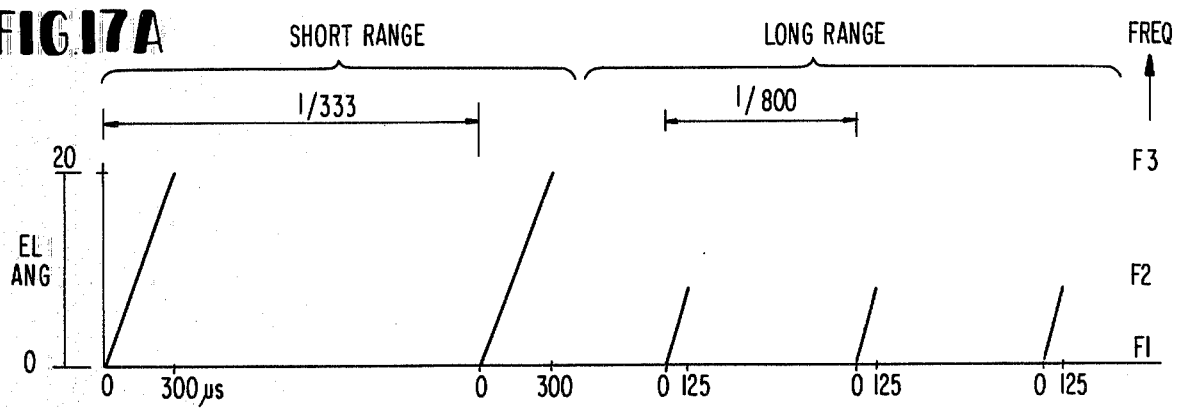
FIGS. 17A-C show how transmitted sweep schedules can be varied.
Figure 17B:
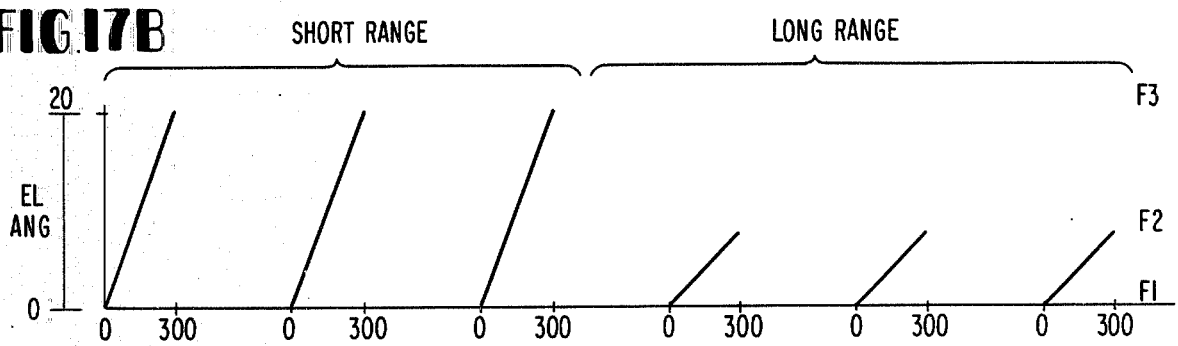

FIG. 17A illustrates transmitted frequency vs. time showing the two extreme sweep rates and duty cycles contemplated for the preferred embodiment. In the left hand portion of FIG. 17A, short range height extraction pulses are illustrated with 300 $\mu$s pulses with PRF of 333 whereas the right hand portion shows long range height extraction pulses, i.e., 125 $\mu$s pulses with PRF of 800. Note that the sweep rate is constant allowing use of the same pulse compression filter. FIG. 17B, on the other hand, shows the same short range transmitted pulses, but now for the long range case pulse width is held constant and instead the sweep rate is reduced so that the smaller frequency range F2-F1 is swept in the same 300 $\mu$s used to sweep the larger range F3-F1. Implementation of this approach merely requires switching out the compressors 110 and 111 and switching in new compressors (such as compressors 110' and 111') compatible with the reduced sweep rate when changes in sweep rate are desired. The PRF can be selected in accordance with transmitter duty cycle limitations.

Figure 17C:
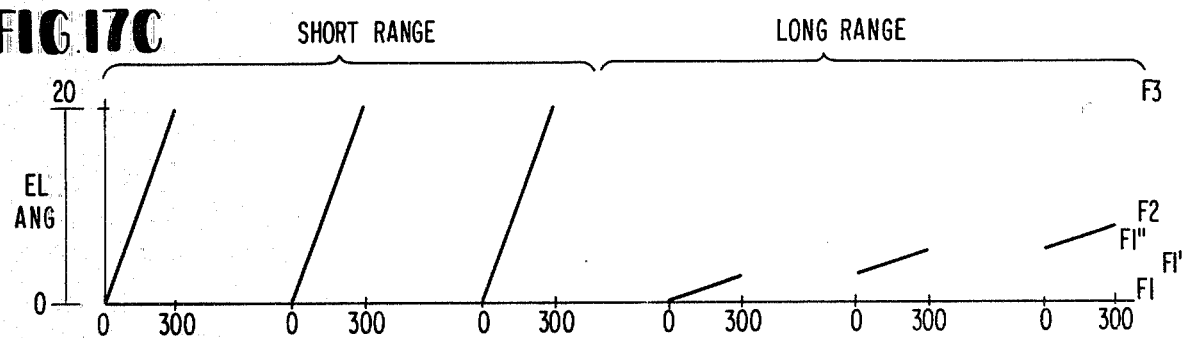

FIG. 17C shows a further variation in the right hand portion, the left hand portion illustrating the same short height extraction pulses as FIGS. 17A and B. In FIG. 17C, both the sweep rate and frequency excursion are changed. That is, a first pulse sweeps F1'-F1, the second sweeps F1"-F1' and the third sweeps F2-F1" with F<F1'<F1"<F2. The advantage of this sweep schedule over FIG. 17B is that even more energy is concentrated at the lower elevations since a 300 $\mu$s. pulse covers the smaller increment F1'-F1, or F1"-F1' or F2-F1" rather than the range F2-F1. Implementation of this approach requires the sequencer 114 to respond to the new sweep schedule as well connecting appropriate pulse compressors.

The flexibility of this approach allows the height finder to operate on any sweep schedule (for which an appropriate compression filter is included) and the sweep schedule can be rapidly altered, even within one azimuth sweep so that, for instance, a short range sweep schedule of FIG. 17A can be used in one azimuth sector and a different sweep schedule can be used at another azimuth sector.

What is claimed is:
1. A three-dimensional radar system comprising:
a two-dimensional radar system for locating objects in terms of azimuth and range from a reference location, including a first r-f receiver/transmitter and a rotatable antenna pointing in a direction, said direction sweeping 360° in azimuth as said antenna is rotated,
said two-dimensional radar system also including a first signal processing means responsive to signals emitted by said first receiver/transmitter for locating range and azimuth of an object by detecting energy reflected from said object, a height finding antenna, mounted on said rotatable antenna, a second r-f receiver/transmitter coupled thereto, said height finding antenna pointing in a second direction, said second direction sweeping 360° in azimuth as said rotatable antenna is rotated, said second direction fixed relative to said first direction, and a second signal processing means responsive to signals from said first processing means and said second receiver/transmitter for determining height of said object.

2. The apparatus of claim 1 in which said second receiver/transmitter includes, transmitter controlling means responsive to object range for controlling antenna radiation.

3. The apparatus of claim 2 wherein said transmitter controlling means includes programmer means to maintain transmitter pulse repetition frequency and pulse width constant for objects within a first predetermined range, and for linearly increasing pulse repetition frequency and decreasing pulse width for objects beyond said first predetermined range.

4. The apparatus of claim 1 wherein said second receiver-transmitter transmits a linearly frequency modulated wave with elevational resolution of $\theta/n$ and elevational coverage of up to $\theta°$ and wherein said second processing means includes p channels, where $p<n$, each of said channels connected to a second receiver output and including a mixing means and bandpass filtered detector means.

5. The apparatus of claim 4 further including compression filter means coupled to said channels.

6. The apparatus of claim 5 in which said channels comprise a plurality of groups of channels and said compression filter means includes a compression filter for each group of channels, time sharing switching means connecting said compression filter to said channels so that at any instant of time only a single compression filter is connected to any one channel.

7. The apparatus of claim 1 wherein said second direction is offset 180° in azimuth from said direction.

8. Apparatus for extending a radar system with a rotating beam emitting antenna pointing in a direction said radar system capable of locating range and azimuth of an object from a reference location and said apparatus extending said radar system so as to locate height of said object comprising:

a height finding antenna, a height finding r-f receiver/transmitter coupled thereto, said height finding antenna mounted on said rotating beam emitting antenna pointing in a second direction fixed in azimuth relative to said direction, a height finding processor responsive to signals from said height finding antenna and to signals from said radar system defining range and azimuth of an object for producing signals identifying height of said object.

9. The apparatus of claim 8 in which said height finding r-f receiver/transmitter includes transmitter controlling means responsive to object range for controlling height finding antenna radiation.

10. The apparatus of claim 9 wherein said transmitter controlling means includes programmer means to maintain transmitter pulse repetition frequency and pulse width constant for objects within a first predetermined range, and for linearly increasing pulse repetition frequency and decreasing pulse width for objects beyond said first predetermined range.

11. The apparatus of claim 8 wherein said height finding r-f receiver/transmitter transmits a linearly frequency modulated wave with elevational resolution of $\theta/n$ where $\theta$ is elevational coverage and n is an integer, and wherein said height finding processor includes p channels, where $p<n$, each of said channels connected to height finding r-f receiver/transmitter output and each said channel including mixing means and bandpass filtered detecting means.

12. The apparatus of claim 11 further including compressor filter means coupled to said channels.

13. The apparatus of claim 12 in which said channels comprise a plurality of groups of channels and said compression filter means includes a compression filter for each group of channels, time sharing switching means connecting said compression filters to said channels so that at any instant of time only a single compression filter is connected to any one channel.

14. The apparatus of claim 8 wherein said second direction is offset 180° in azimuth from direction.

15. A matched filter radar processor for processing target reflected signals derived from a linearly frequency modulated transmission for target elevation extraction from an elevation antenna with aperture $\theta/n$, where $\theta$ is total scanned elevation, which minimizes equipment duplication by use of target range data comprising:

a frequency conversion means for receiving said reflected signals and down converting said signals in frequency, compression filter means coupled to said frequency conversion means and providing as an output, a frequency compressed version of said down converted signals, p processing channels each including a mixer, bandpass filter and detector, where $p<n$, each of said processing channels connected to receive said compression filter means output, a local oscillator means having p outputs, each connected to a different one of said mixers in said processing channels, each of said p outputs providing a different output which, when mixed in an associated mixer in the presence of a returned signal, produces a signal of identical frequency spectrum in each of said channels, and triggering means to enable said local oscillator means to produce said outputs delayed from antenna transmissions by a quantity related to target range.

16. The apparatus of claim 15 wherein said compression filter means includes two compression filters connected to said frequency conversion means output by respective first and second mixers, each compression filter output coupled through respective first and second switching means to said p processing channels, a second local oscillator means with two outputs a different one of said outputs connected to inputs of said first and second mixers, each of said outputs including q segments of different frequencies in timed succession, said second local oscillator means enabled by said triggering means, sequencing means for operating said first and second switching means in a predetermined sequence and enabled by said triggering means whereby with $2\,q \times p$ at least equal to n, said p processing channels are time shared to process said returned signals to extract height information to accuracy of θ/n.

17. The apparatus of claim 15 in which also included is
 a search radar system, including a rotatable search antenna, for providing said target range data,
 said elevation antenna mounted on said search antenna and pointing opposite in direction to the direction of said rotating search antenna.

18. A matched filter radar processor for extracting target height from reflected signals produced by a linearly frequency modulated pulsed transmission from an elevation antenna of aperture θ/n, where θ is total scanned elevation, which minimizes equipment duplication by employing target range data comprising:
 a frequency conversion means responsive to said reflected signals for down converting said signals in frequency,
 processing means responsive to said down converted signals including a mixer and a compression filter for compressing outputs of said mixer,
 a local oscillator connected to said mixer producing in time sequence a plurality of different frequencies,
 and trigger means to enable said local oscillator a predetermined time after transmission, said predetermined time varying in accordance with target range.

19. The apparatus of claim 18 in which said processing means further includes
 a second compression filter,
 a second mixer coupling an output of said frequency conversion means to said second compression filter,
 said local oscillator providing one input to said mixer comprising a timed sequence of a plurality of different frequencies and also providing to said second mixer an input comprising a timed sequence of a plurality of different frequencies, the frequencies and time duration of said local oscillator output restricting the frequency spectrum in both said compression filters to a common range.

20. The apparatus of claim 18 in which said processing means further includes
 a plurality of p processing channels each processing signals within a common frequency range and including a mixer, bandpass filter and detector,
 a second local oscillator providing an output at a different frequency to each mixer in said processing channels, and,
 time sharing switching means, enabled by said triggering means to sequentially connect different ones of said processing channels to an output of said compression filter.

21. The apparatus of claim 20 in which said processing means further includes:
 a second compression filter,
 a second mixture coupling an output of said frequency conversion means to said second compression filter,
 said local oscillator providing one input to said mixer comprising a timed sequence of a plurality of different frequencies and also providing to said second mixer an input comprising a timed sequence of a plurality of different frequencies, the frequencies and time durations of said local oscillator restricting the frequency spectrum in both said compression filters to a common range.

22. The apparatus of claim 18 which further includes
 a search radar system, including a rotatable search antenna, for providing said target range data,
 said elevation antenna mounted on said search antenna and pointing opposite in direction to the direction of said rotatable search antenna.

* * * * *